(12) United States Patent
Frankman et al.

(10) Patent No.: US 8,545,918 B2
(45) Date of Patent: Oct. 1, 2013

(54) METHOD OF CUTTING HAM AND PRODUCT THEREOF

(75) Inventors: Lawrence Stephan Frankman, Sioux Falls, SD (US); Michael Dykes, Tea, SD (US); Kelly Nelson Wright, Brandon, SD (US)

(73) Assignee: Jonmore Investments, Inc., Wilmington, DE (US)

( * ) Notice: Subject to any disclaimer, the term of this patent is extended or adjusted under 35 U.S.C. 154(b) by 1017 days.

(21) Appl. No.: 12/122,940

(22) Filed: May 19, 2008

(65) Prior Publication Data

US 2009/0285973 A1    Nov. 19, 2009

(51) Int. Cl.
*A23L 1/31* (2006.01)
*A23L 1/00* (2006.01)
*A22C 17/00* (2006.01)

(52) U.S. Cl.
CPC ............ *A23L 1/0073* (2013.01); *A23L 1/3103* (2013.01); *A22C 17/002* (2013.01); *A22C 17/0033* (2013.01)
USPC ............................ 426/467; 426/480; 452/198

(58) Field of Classification Search
CPC ............ A22C 17/002; A22C 17/0033; A23L 1/0073; A23L 1/3103; B26D 2210/02; B26D 5/00
USPC ................................ 426/647, 480; 452/198
See application file for complete search history.

(56) References Cited

U.S. PATENT DOCUMENTS 5,989,607 A * 11/1999 Dieso et al. .................... 426/112
7,214,403 B1 * 5/2007 Peters ........................... 426/641

* cited by examiner

*Primary Examiner* — Donald Tarazano
*Assistant Examiner* — Jerry W Anderson
(74) *Attorney, Agent, or Firm* — Hunton & Williams LLP

(57) ABSTRACT

A ham product and method for production thereof described herein separate bone-in hams into smaller pieces. Accordingly, pieces of bone-in ham, even those spirally-sliced, will be available to consumers in smaller portions. Unlike conventional methods, however, the ham product provides three or four pieces of essentially equal size that each have a nearly equal meat-to-bone ratio. Furthermore, when a spiral cut ham is separated into pieces, each piece includes a portion of the femur and retains attachment of the slices to the femur so that the slices stay intact during handling and packaging and so that the pieces retain the natural shape and easy handling desired by consumers.

11 Claims, 16 Drawing Sheets

METHOD OF CUTTING HAM AND PRODUCT THEREOF

BACKGROUND OF THE INVENTION

1. Field of the Invention

The field of the invention relates to a ham product and method for production thereof and, more specifically, to separating a bone-in ham into smaller pieces.

2. Description of the Related Art

It has been recognized that many consumers are hesitant to purchase an entire bone-in ham because there is more meat than the consumer can conveniently consume. As a result, bone-in hams are commonly sold at retail in half portions. In a conventional method for producing ham portions, the full bone-in ham is cut transversely through a femur bone in order to cut the product into a butt half, which includes the butt end, and a shank half, which includes the shank tip. The butt half includes an aitch bone and part of the femur bone. The shank half includes a shank bone and the remainder of the femur bone. Both the butt half and the shank half are visually appealing in that only the ends of the femur are visible and the product is not unsightly.

Spirally-sliced bone-in ham products are popular with consumers, largely because of the convenience of being able to easily remove the pre-sliced ham pieces from the product. A spirally-sliced bone-in ham is produced by slicing it in a manner to form a continuous spiral cut around a centrally-located bone, such as a femur bone. Thus, the meat remains substantially connected to the bone such that the spirally-sliced ham remains intact and can be handled and packaged without pieces falling off, folding over, and otherwise deforming. As a result, a spiral-sliced bone-in ham combines the appealing visual characteristics of an intact ham with convenience of slices that are easily detached from the bone and served. Furthermore, since the ham is sold with meat attached to bone, the consumer has reassurance that the meat is not adulterated with undesirable fillers or byproducts.

Although bone-in ham products of this type have been well received, the amount of meat they contain can still be excessive for consumers and smaller occasions where the product is consumed by only a relatively small number of people. Additionally, as the size of hogs has increased, a bone-in ham is likely to be larger. A consumer does not have as much of a need for such a large bone-in ham. Moreover, family size has been decreasing. Accordingly, families do not desire as much bone-in ham. As prices of pork products increase, consumers desire a lower priced product, which will likely correlate directly with the product weight.

Consequently, there is the need to cut bone-in hams into smaller products in order to allow consumers the option of purchasing a smaller amount of meat. Products that provide a third or a quarter of a ham are particularly desired to give the consumer a range of purchasing options.

U.S. Pat. No. 5,989,607 to Dieso ("the '607 patent") which is hereby incorporated by reference in its entirety, discloses a ham product that is formed by cutting a spirally-sliced half-ham longitudinally through the bone. The cut can be made by feeding the half-ham through a band saw blade by hand, by pushing a split cart through the blade, or by feeding the product through the blade on a split belt conveyor. Whatever method is used involves aligning the femur with the saw blade so that the femur is cut longitudinally and the meat remains attached to the bone around approximately half of its original circumference. Each half ham is cut longitudinally through the femur into a pair of substantially mirror image products that are each approximately one-fourth of the full ham. Even though the resulting one-fourth ham product is somewhat delicate, the slices remain attached to the bone securely enough to stay intact so that handling and packaging can be carried out in a commercially acceptable manner.

The method in the '607 patent presents some issues with regards to non-uniformity of the pieces. When the ham is cut on the "long axis" of the meat as disclosed in the '607 patent (e.g. depicted in FIGS. 1 through 5), the aitch bone is separated unevenly. Almost the entire aitch bone is situated in one of the resulting pieces, and that piece is particularly undesirable for its low meat-to-bone ratio. Consequently, one undesirable piece is produced from each cut ham. This leads to potential waste, as the undesirable pieces may be difficult to sell, and can cause confusion and dissatisfaction among consumers who may unwittingly purchase a piece with a higher bone content than expected.

U.S. Pat. No. 7,214,403 to Peters ("the '403 patent"), which is hereby incorporated by reference in its entirety, discloses a product formed by cutting a ham into three or four pieces. The femur is cut only once, in a direction transverse to the femur, thus only the ends of the femur are visible. Each quarter or portion having a bone exposes the bone only along a substantially flat surface on its sides.

In a spirally sliced bone-in ham, the femur provides structural support for the slices. When a spiral sliced bone-in ham is processed according to the disclosure of the '403 patent, a boneless piece is produced that does not include any part of the femur. Without the structural support provided by attachment to the femur, slices of ham may fall off, fold over, and otherwise deform, requiring extra care in packaging and transporting the product, and potentially necessitating insertion of a skewer or other support mechanism. Despite such extra care, such a delicate product may nonetheless exhibit an irregular shape that appears "processed" and makes an unattractive presentation at the dinner table. Thus, the pieces of ham lacking the structural support of the femur may lose some consumer appeal.

Further, when a ham is processed according to the disclosure of the '403 patent the bones are divided unevenly between the pieces, resulting in different types of pieces having different characteristics. One piece of each ham is essentially boneless, leaving less meat to be divided with the remaining bone and causing the other pieces to have a lower meat-to-bone ratio than the original ham. Among each of the pieces that contain a bone have only a small amount of bone visible on the cut faces, yet the meat-to-bone ratio varies greatly between these pieces. As each piece displays only a small amount of bone on the surface, the bone content of the pieces may not be visually apparent to the consumer. Consumers may be confused by pieces having similar amount of exposed bone but greatly varying meat-to-bone ratios, and may be reluctant to purchase pieces whose bone content appears to be uncertain.

SUMMARY OF THE INVENTION

What is desired is a product and a method for production thereof for separating a bone-in ham into smaller pieces. The desired method can separate a bone-in ham to provide three or four pieces of essentially equal size that each have an essentially equal meat-to-bone ratio. Further, when dividing a spiral-sliced bone-in ham, the desired method retains attachment of the slices to the femur so that the slices stay intact during handling and packaging and the pieces retain the natural shape and easy handling desired by consumers.

A ham product and method for production thereof described herein separate bone-in hams into smaller pieces.

Accordingly, pieces of bone-in ham, even those spirally-sliced, can be cut into smaller products according to the method described herein. Unlike conventional methods, however, each of the pieces of a ham have an essentially equal meat-to-bone ratio. As a result, undesirable pieces having a relatively higher bone content than other pieces are avoided.

Thus, in one embodiment the invention provides a method of separating a bone-in ham, the method comprising the steps of: separating a bone-in ham into a butt-end piece and a shank-end piece; and separating the butt-end piece into a first portion and a second portion; wherein the weight of aitch bone in the first portion and the second portion differ by less than approximately 25%; and the weight of femur bone in the first portion and the second portion differ by less than approximately 25%. In an embodiment of the invention, the butt-end piece is separated into the first portion and the second portion along a plane that divides the femur substantially longitudinally, and the angle between said plane and the long axis of the bone-in ham is between approximately 40 degrees and approximately 50 degrees. In an embodiment of the invention, said angle is between approximately 43 and approximately 47 degrees. In an embodiment of the invention, said angle is approximately 45 degrees. In an embodiment of the invention, the butt-end piece comprises between 55% and 75% by weight of the bone-in ham. In an embodiment of the invention, the butt-end piece comprises between approximately 35% and 55% by weight of the bone-in ham. In an embodiment of the invention, the method further comprises separating the shank-end piece into a third portion and a fourth portion. In an embodiment of the invention, the bone-in ham is spiral-sliced. In an embodiment of the invention, the bone-in ham is not spiral-sliced. In an embodiment of the invention, the method further comprises removing a shank bone from the ham. In an embodiment of the invention, one or more of the steps of providing a separation comprises cutting the bone-in ham using a knife, a saw, a bandsaw, a table saw, a blade, or combinations thereof.

In another embodiment, the invention provides a bone-in ham product made by a method comprising the steps of: separating a bone-in ham into a butt-end piece and a shank-end piece; and separating the butt-end piece into a first portion and a second portion; wherein the weight of aitch bone in the first portion and the second portion differ by less than approximately 25%; and the weight of femur bone in the first portion and the second portion differ by less than approximately 25%. In an embodiment of the invention, the butt-end piece is separated into the first portion and the second portion along a plane that divides the femur substantially longitudinally, and the angle between said plane and the long axis of the bone-in ham is between approximately 40 degrees and approximately 50 degrees. In an embodiment of the invention, said angle is between approximately 43 and approximately 47 degrees. In an embodiment of the invention, said angle is approximately 45 degrees. In an embodiment of the invention, the butt-end piece comprises between 55% and 75% by weight of the bone-in ham. In an embodiment of the invention, the butt-end piece comprises between approximately 35% and 55% by weight of the bone-in ham. In an embodiment of the invention, the method further comprises separating the shank-end piece into a third portion and a fourth portion. In an embodiment of the invention, the bone-in ham is spiral-sliced. In an embodiment of the invention, the bone-in ham is not spiral-sliced. In an embodiment of the invention, substantially all of the shank bone has been removed from the ham. In an embodiment of the invention, one or more of the steps of providing a separation comprises cutting the bone-in ham using a knife, a saw, a bandsaw, a table saw, a blade, or combinations thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE FIGURES

The present invention will be more clearly understood from a reading of the following description in conjunction with the accompanying exemplary figures wherein.

DETAILED DESCRIPTION OF THE PREFERRED EMBODIMENTS

Reference will now be made in detail to the preferred embodiments of the present invention, examples of which are illustrated in the accompanying drawings.

Figure 1A:
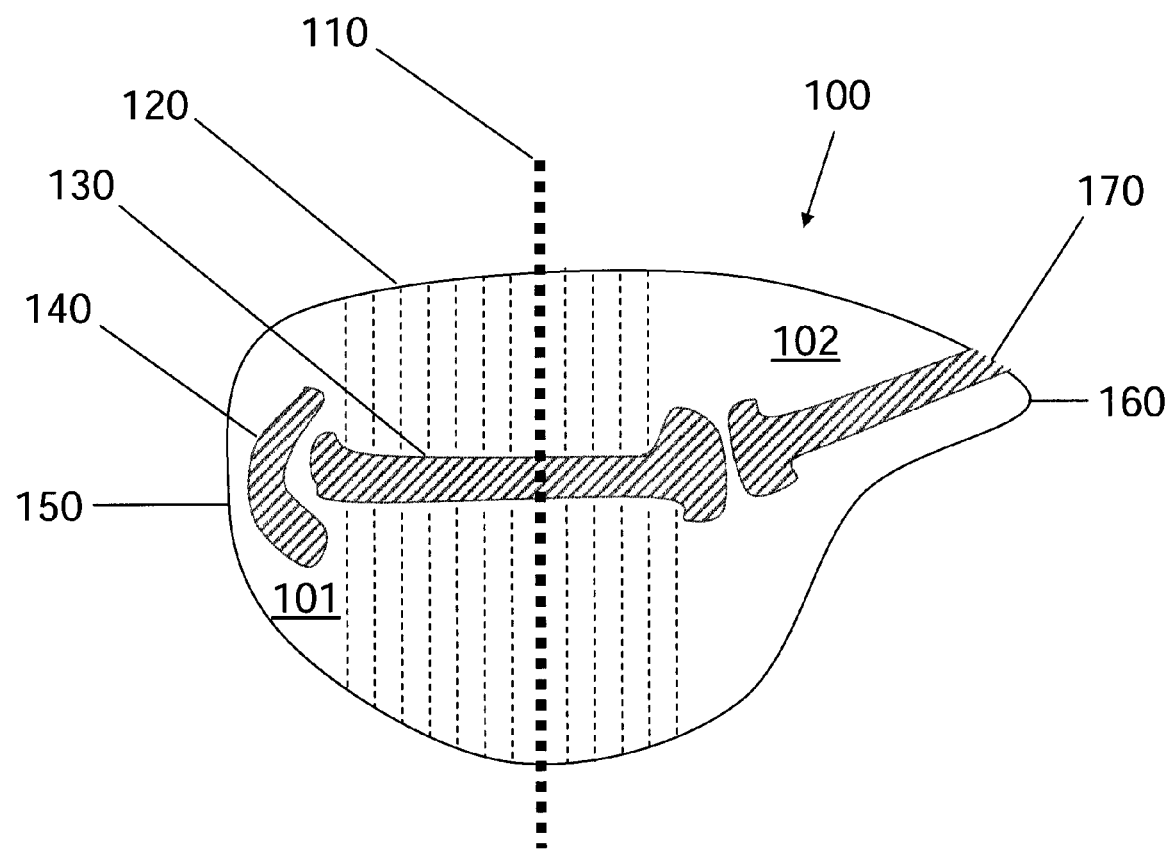
FIG. 1a shows a short-shank ham according to an exemplary embodiment of the present invention.

Referring to FIG. 1a, a short-shank ham is shown according to an exemplary embodiment of the present invention. A person of ordinary skill in the art recognizes that the short-shank ham 100 is not drawn to scale and may have any configuration of the bones contained therein, as known to one of ordinary skill in the art. Short-shank ham 100 typically comprises three bones: a shank bone 170, a femur bone 130, and an aitch bone 140. The aitch bone 140 is positioned substantially at the butt end 150 of the short-shank ham 100. The shank bone 170 extends substantially from a shank tip 160 of the short-shank ham 100 to the femur bone 130, which is positioned at a different angle from the shank bone 170. At the butt end 150 of the short-shank ham 100, the femur bone 130 is proximate to the aitch bone 140. In an exemplary embodiment of the present invention, the short-shank ham may be spirally-sliced 120 substantially the length of the short-shank ham 100 and substantially centered about the femur bone 130. A short-shank ham 100 may be separated along a transverse plane 110, resulting in a butt-end piece 101 and a shank-end piece 102.

Figure 1B:
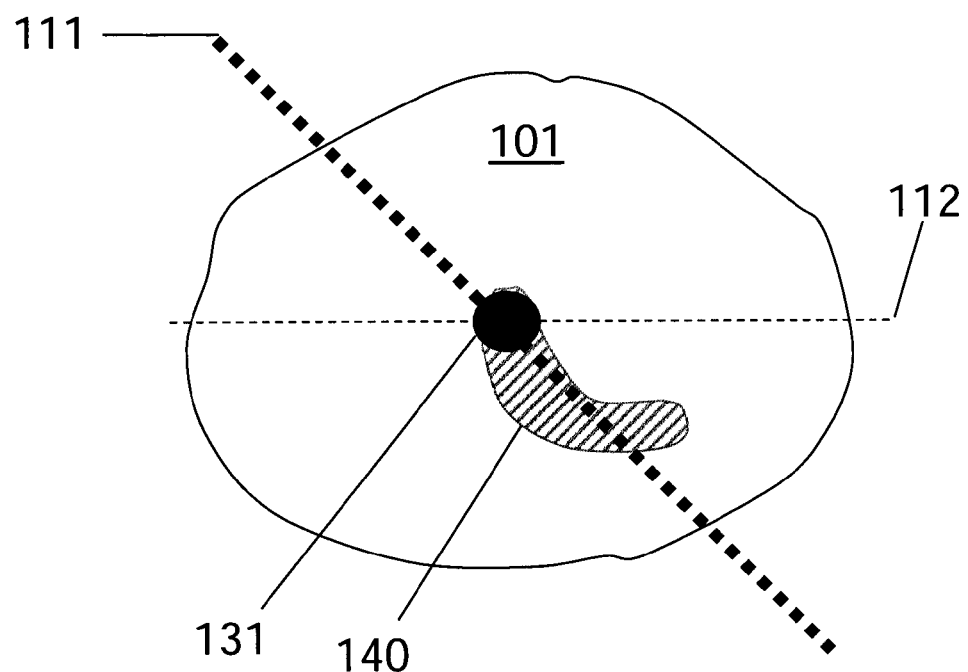
FIG. 1b shows a butt-end piece of a short-shank ham according to an exemplary embodiment of the present invention.
Figure 1C:
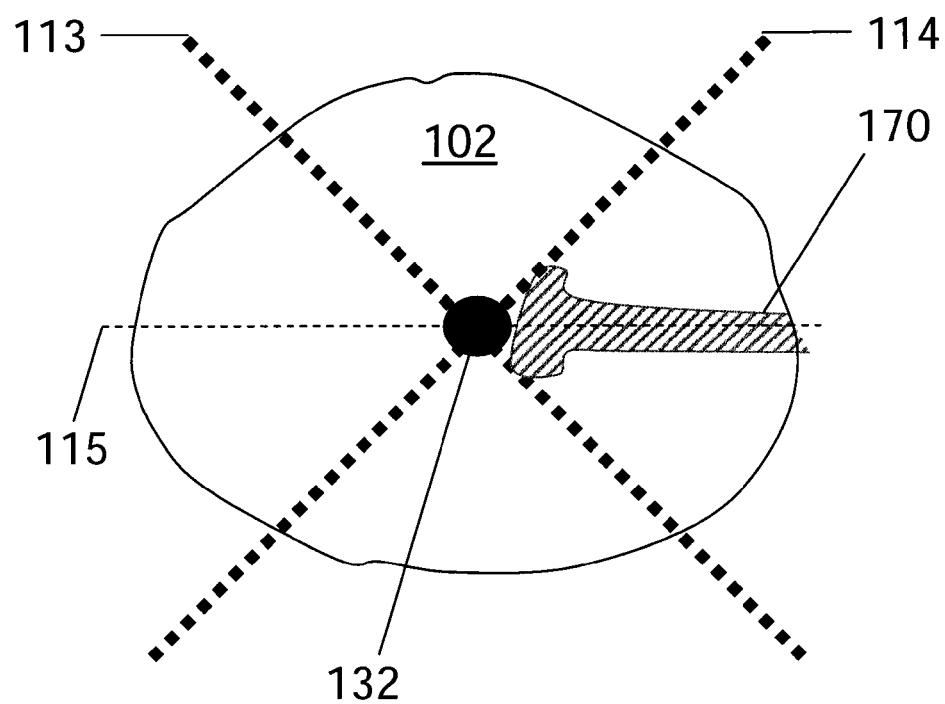
FIG. 1c shows a shank-end piece of a short-shank ham according to an exemplary embodiment of the present invention.

Referring also to FIGS. 1b and 1c, shown are views of the cut faces of the butt-end piece 101 and shank-end piece 102, respectively, according to an exemplary embodiment of the present invention. The aitch bone 140 and shank bone 170 are shown crosshatched to indicate that they are inside the meat and thus would not be visible on the cut faces.

A separation along the transverse plane 110 separates the femur bone 130 into the butt-end piece of the femur 131 and the shank-end piece of the femur 132. In an exemplary embodiment of the present invention, the ham may be spirally sliced and the separation along transverse plane 110 may separate a short-shank ham 100 between spiral slices 120. In another exemplary embodiment of the invention, a ham that is not spirally sliced may be separated along the transverse plane 110. In an embodiment of the invention, the butt-end piece 101 comprises between approximately 35% and approximately 55% by weight of the short-shank ham 100. In another embodiment of the invention, the butt-end piece 101 comprises between approximately 40% and approximately 50% by weight of the short-shank ham 100. In yet another embodiment of the invention, the butt-end piece 101 comprises between approximately 43% and approximately 47% by weight of the short-shank ham 100. In still another embodiment of the invention, the butt-end piece 101 comprises approximately 45% by weight of the short-shank ham 100.

Figure 1D:
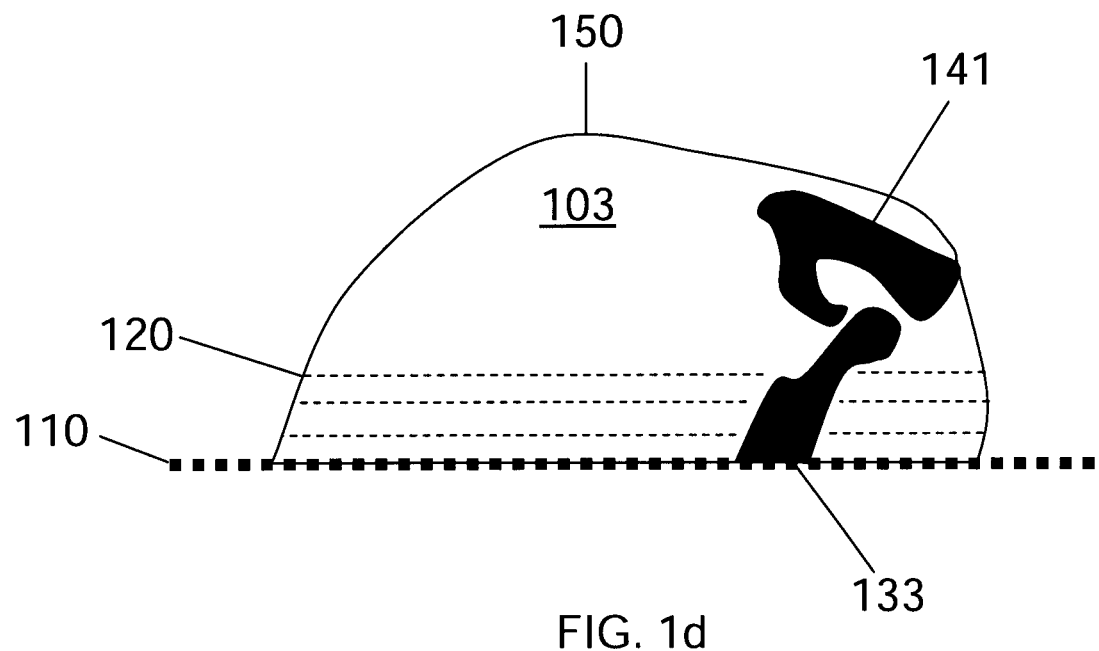
FIG. 1d shows a butt-end quarter of a short-shank ham according to an exemplary embodiment of the present invention.
Figure 1E:
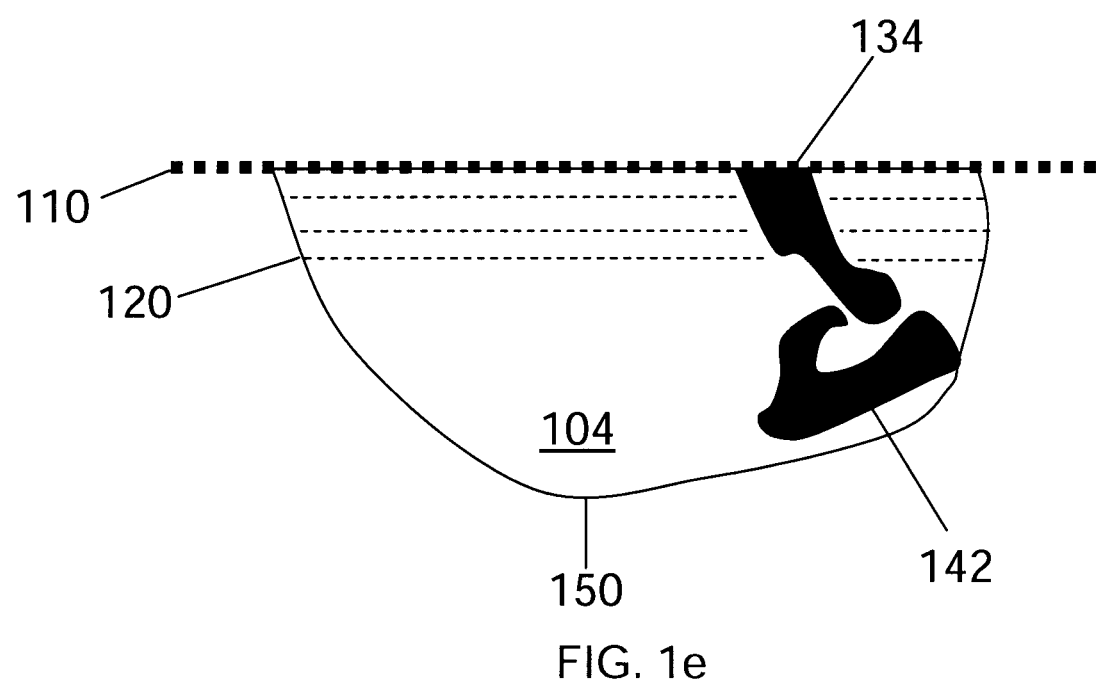
FIG. 1e shows a butt-end quarter of a short-shank ham according to an exemplary embodiment of the present invention.

Referring now to FIGS. 1b, 1d and 1e, pieces of a short-shank ham may be made according to an exemplary embodiment of the invention by separating the butt-end piece 101. The butt-end piece 101 may be separated along the longitudinal plane 111, resulting in a first piece 103 and a second piece 104. The separation along longitudinal plane 111 is made such that the aitch bone is divided into pieces of substantially equal weight. The longitudinal plane 111 is substantially perpendicular to the cut face of the butt-end piece 101. According to an embodiment of the invention, the angle between the longitudinal plane 111 and the long axis of the butt-end piece 112 is between approximately 40 degrees and approximately 50 degrees. According to another embodiment of the invention, the angle between the longitudinal plane 111 and the long axis of the butt-end piece 112 is between approximately 43 degrees and approximately 47 degrees. According to yet another embodiment of the invention, the angle between the longitudinal plane 111 and the long axis of the butt-end piece 112 is approximately 45 degrees.

Separation of the butt-end piece 101 along the longitudinal plane 111 divides the aitch bone 140 into a first aitch bone piece 141 and a second aitch bone piece 142. In an embodiment of the invention, the weights of the first aitch bone piece 141 and the second aitch bone piece 142 would differ, for example, by less than approximately 25%, or in another embodiment by less than approximately 20%, or in another embodiment by less than approximately 15%, or in another embodiment by less than approximately 10%, or in yet another embodiment by less than approximately 5%, and in still another embodiment by less than approximately 1%.

Separation of the butt-end piece 101 along the longitudinal plane 111 also divides the butt-end piece of the femur 131 into a first butt-end piece of the femur 133 and a second butt-end piece of the femur 134. In an embodiment of the invention, the weights of the first butt-end piece of the femur 133 and the second butt-end piece of the femur 134 would differ, for example, by less than approximately 25%, or in another embodiment by less than approximately 20%, or in another embodiment by less than approximately 15%, or in another embodiment by less than approximately 10%, or in yet another embodiment by less than approximately 5%, and in still another embodiment by less than approximately 1%.

Figure 1F:
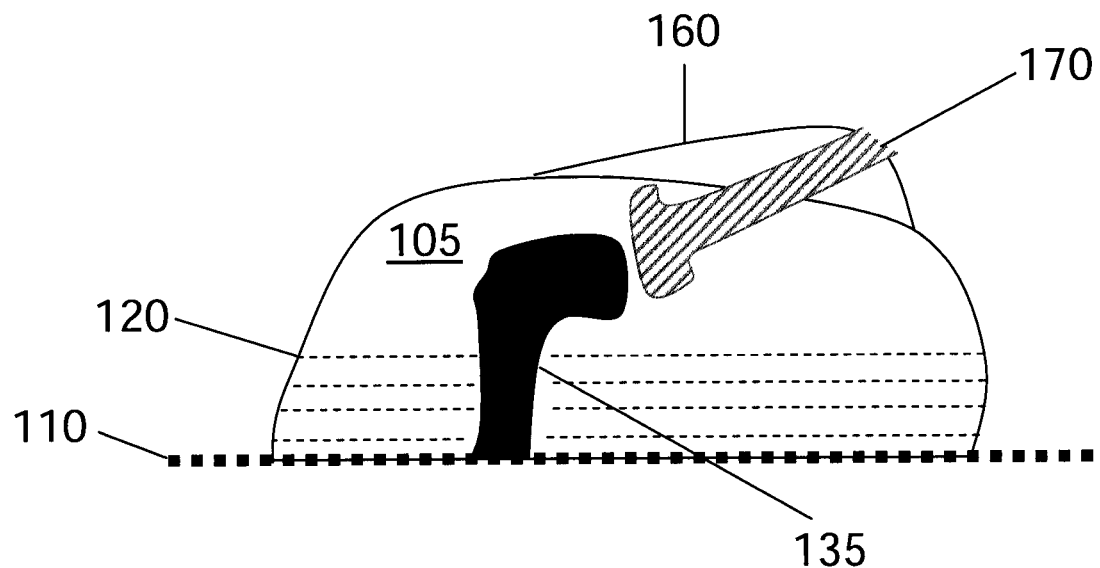
FIG. 1f shows a shank-end quarter of a short-shank ham according to an exemplary embodiment of the present invention.
Figure 1G:
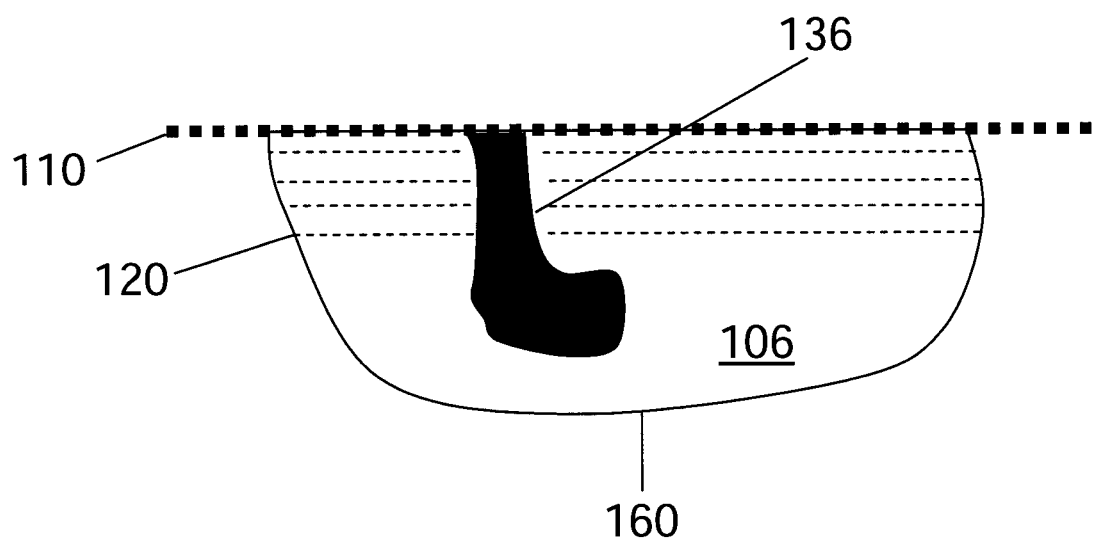
FIG. 1g shows a shank-end quarter of a short-shank ham according to an exemplary embodiment of the present invention.

Referring now to FIGS. 1c, 1f and 1g, pieces of a short-shank ham may be made according to an exemplary embodiment of the invention by separating the shank-end piece 102. The shank bone 170 is shown crosshatched to indicate that it is inside the meat and thus would not be visible on the cut face. The shank-end piece 102 may be separated along a first longitudinal plane 113 or a second longitudinal plane 114, resulting in a first piece 103 and a second piece 104. The plane along which the separation is made is substantially perpendicular to the cut face of the shank-end piece 102. According to an embodiment of the invention, the angle between the plane along which the separation is made and the long axis of the shank-end piece 115 is between approximately 40 degrees and approximately 50 degrees. According to another embodiment of the invention, the angle between the plane along which the separation is made and the long axis of the shank-end piece 115 is between approximately 43 degrees and approximately 47 degrees. According to yet another embodiment of the invention, the angle between the plane along which the separation is made and the long axis of the shank-end piece 115 is approximately 45 degrees.

According to another exemplary embodiment of the present invention, the shank-end piece 102 may instead be separated along the long axis of the shank piece 115, in which case the shank bone would also be divided between the resultant pieces. In an embodiment of the invention, the weights of two pieces of the shank bone would differ, for example, by less than approximately 25%, or in another embodiment by less than approximately 20%, or in another embodiment by less than approximately 15%, or in another embodiment by less than approximately 10%, or in yet another embodiment by less than approximately 5%, and in still another embodiment by less than approximately 1%.

Whether the shank-end piece 102 is separated along the first longitudinal plane 113, the second longitudinal plane 114, or the long axis 115 of the shank piece, separation of the shank-end piece 102 divides the shank-end piece of the femur 132 into a first shank-end piece of the femur 135 and a second shank-end piece of the femur 136. In an embodiment of the invention, the weights of the first shank-end piece of the femur 135 and the second shank-end piece of the femur 136 would differ, for example, by less than approximately 25%, or in another embodiment by less than approximately 20%, or in another embodiment by less than approximately 15%, or in another embodiment by less than approximately 10%, or in yet another embodiment by less than approximately 5%, and in still another embodiment by less than approximately 1%.

Referring to FIGS. 1d, 1e, 1f, and 1g, a short-shank ham is shown divided into four pieces according to an exemplary embodiment of the invention. In an embodiment of the invention, in the pieces made from a single ham the weights of the heaviest and the lightest pieces differ, for example, by less than approximately 25%, or in another embodiment by less than approximately 20%, or in another embodiment by less than approximately 15%, or in another embodiment by less than approximately 10%, or in yet another embodiment by less than approximately 5%, and in still another embodiment by less than approximately 1%. In another embodiment of the invention, in the pieces made from a single ham the total weight of bone in the piece having the most bone and the piece having the least bone differ, for example, by less than approximately 25%, or in another embodiment by less than approximately 20%, or in another embodiment by less than approximately 15%, or in another embodiment by less than approximately 10%, or in yet another embodiment by less than approximately 5%, and in still another embodiment by less than approximately 1%. In yet another embodiment of the invention, in the pieces made from a single ham the ratio of meat to bone in the piece having the highest ratio of meat-to-bone and the piece having the lowest ratio of meat-to-bone would differ, for example, by less than approximately 25%, or in another embodiment by less than approximately 20%, or in another embodiment by less than approximately 15%, or in another embodiment by less than approximately 10%, or in yet another embodiment by less than approximately 5%, and in still another embodiment by less than approximately 1%.

Figure 2A:
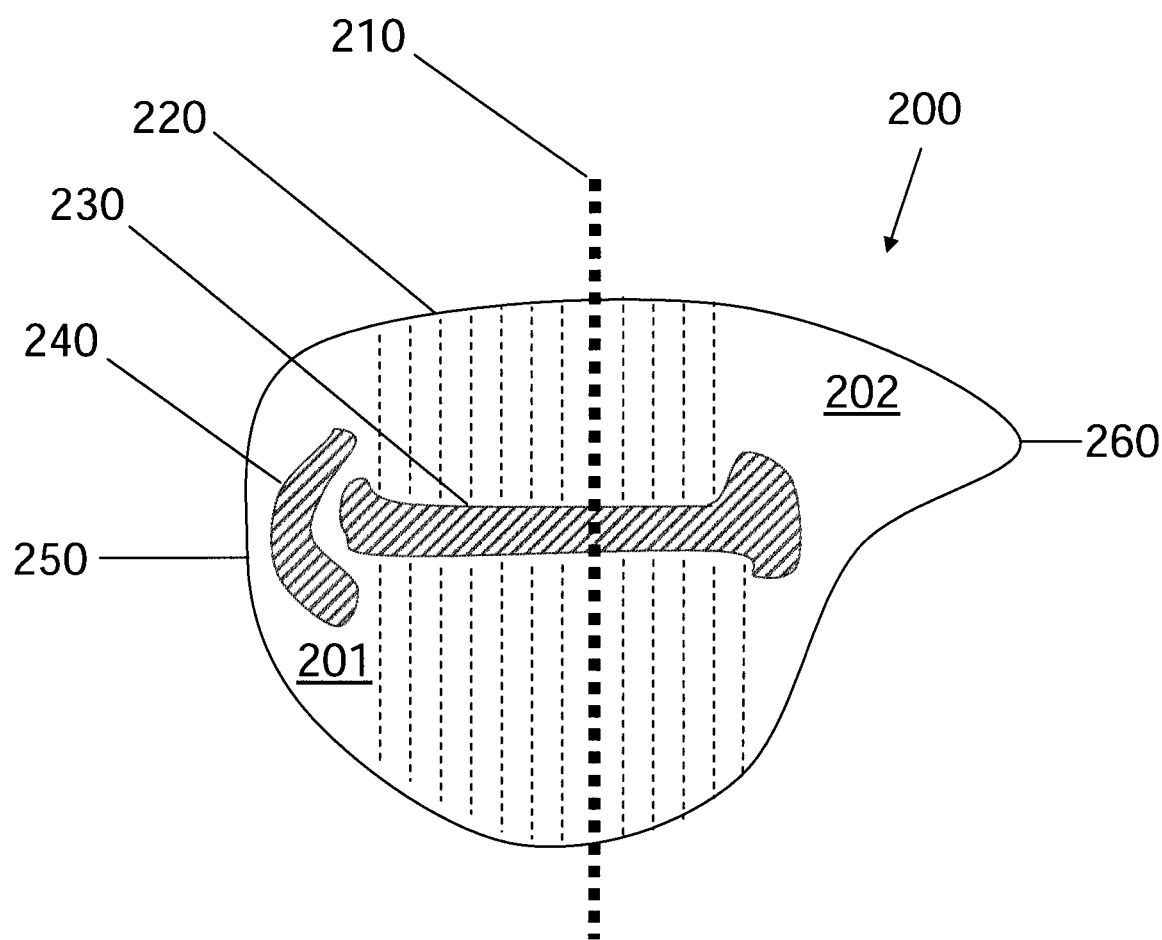
FIG. 2a shows a shank bone out (SBO) ham according to an exemplary embodiment of the present invention.

Referring to FIG. 2a, a shank bone out (SBO) ham is shown according to an exemplary embodiment of the present invention. A person of ordinary skill in the art recognizes that the SBO ham 200 is not drawn to scale and may have any configuration of the bones contained therein, as known to one of ordinary skill in the art. SBO ham 200 typically comprises two bones: a femur bone 230, and an aitch bone 240. The aitch bone 240 is positioned substantially at the butt end 250 of the SBO ham 200. At the butt end 250 of the SBO ham 200, the femur bone 230 is proximate to the aitch bone 240. In an exemplary embodiment of the present invention, the SBO ham may be spirally-sliced 220 substantially the length of the SBO ham 200 and substantially centered about the femur bone 230. A SBO ham 200 may be separated along a transverse plane 210, resulting in a butt-end piece 201 and a shank-end piece 202.

Figure 2B:
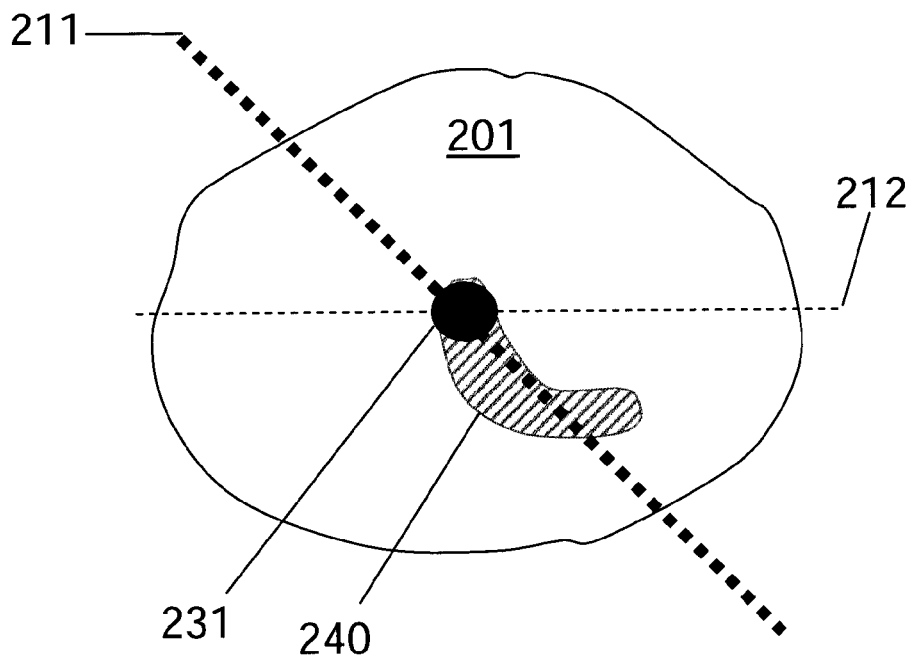
FIG. 2b shows a butt-end piece of a SBO ham according to an exemplary embodiment of the present invention.
Figure 2C:
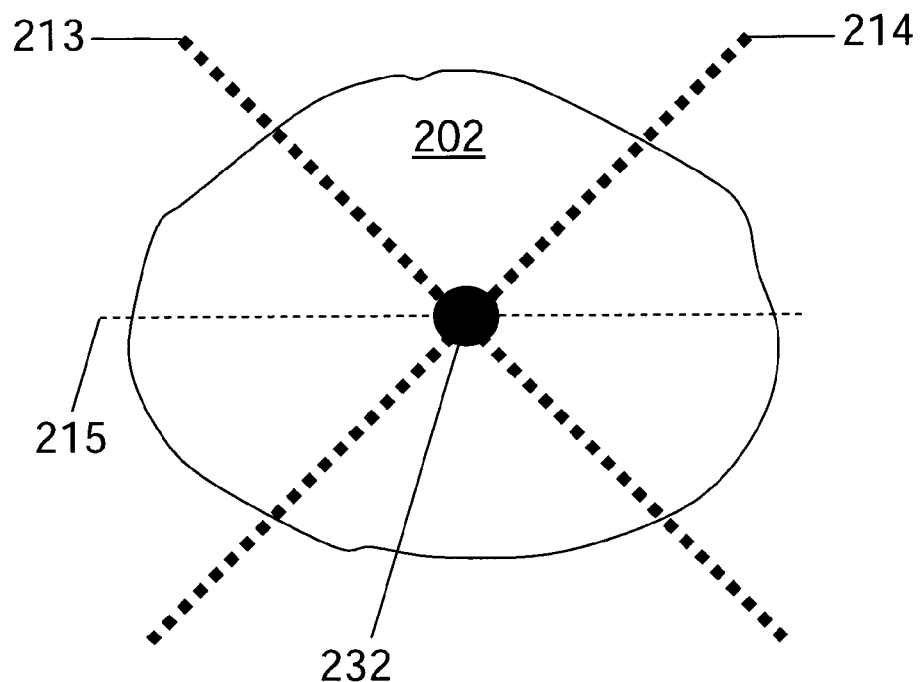
FIG. 2c shows a shank-end piece of a SBO ham according to an exemplary embodiment of the present invention.

Referring also to FIGS. 2b and 2c, shown are views of the cut faces of the butt-end piece 201 and shank-end piece 202, respectively, according to an exemplary embodiment of the present invention. The aitch bone 240 is shown crosshatched to indicate that it is inside the meat and thus would not be visible on the cut face.

A separation along the transverse plane 210 separates the femur bone 230 into the butt-end piece of the femur 231 and the shank-end piece of the femur 232. In an exemplary embodiment of the present invention, the ham may be spirally sliced and the separation along transverse plane 210 may separate a SBO ham 200 between spiral slices 220. In another exemplary embodiment of the invention, a ham that is not spirally sliced may be separated along the transverse plane 210. In an embodiment of the invention, the butt-end piece 201 comprises between approximately 35% and approximately 55% by weight of the SBO ham 200. In another embodiment of the invention, the butt-end piece 201 comprises between approximately 40% and approximately 50% by weight of the SBO ham 200. In yet another embodiment of the invention, the butt-end piece 201 comprises between approximately 43% and approximately 47% by weight of the SBO ham 200. In still another embodiment of the invention, the butt-end piece 201 comprises approximately 45% by weight of the SBO ham 200.

Figure 2D:
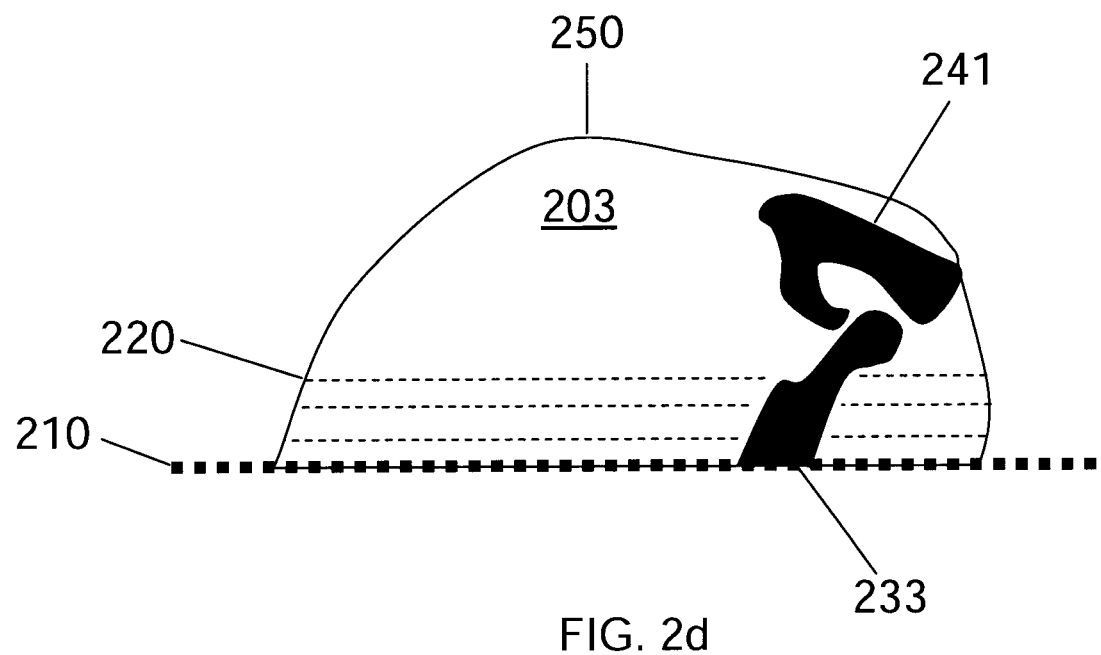
FIG. 2d shows a butt-end quarter of a SBO ham according to an exemplary embodiment of the present invention.
Figure 2E:
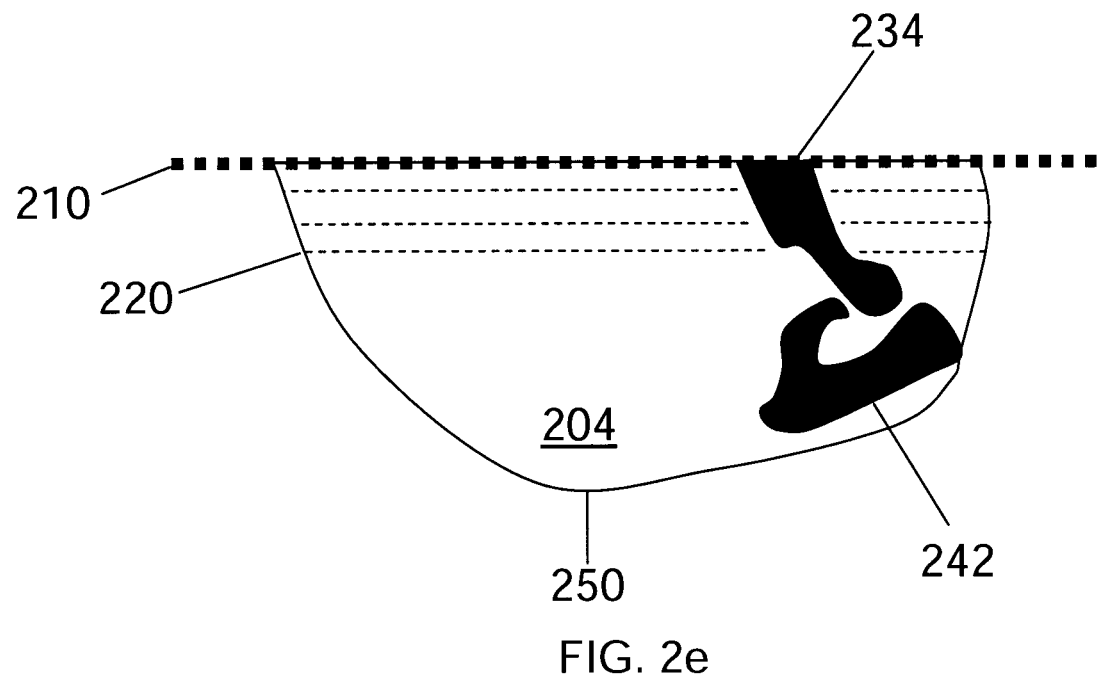
FIG. 2e shows a butt-end quarter of a SBO ham according to an exemplary embodiment of the present invention.

Referring now to FIGS. 2b, 2d and 2e, pieces of a SBO ham may be made according to an exemplary embodiment of the invention by separating the butt-end piece 201. The butt-end piece 201 may be separated along the longitudinal plane 211, resulting in a first piece 203 and a second piece 204. The separation along longitudinal plane 211 is made such that the aitch bone is divided into pieces of substantially equal weight. The longitudinal plane 211 is substantially perpendicular to the cut face of the butt-end piece 201. According to an embodiment of the invention, the angle between the longitudinal plane 211 and the long axis of the butt-end piece 212 is between approximately 40 degrees and approximately 50 degrees. According to another embodiment of the invention, the angle between the longitudinal plane 211 and the long axis of the butt-end piece 212 is between approximately 43 degrees and approximately 47 degrees. According to yet another embodiment of the invention, the angle between the longitudinal plane 211 and the long axis of the butt-end piece 212 is approximately 45 degrees.

Separation of the butt-end piece 201 along the longitudinal plane 211 divides the aitch bone 240 into a first aitch bone piece 241 and a second aitch bone piece 242. In an embodiment of the invention, the weights of the first aitch bone piece 241 and the second aitch bone piece 242 would differ, for example, by less than approximately 25%, or in another embodiment by less than approximately 20%, or in another embodiment by less than approximately 15%, or in another embodiment by less than approximately 10%, or in yet another embodiment by less than approximately 5%, and in still another embodiment by less than approximately 1%.

Separation of the butt-end piece 201 along the longitudinal plane 211 also divides the butt-end piece of the femur 231 into a first butt-end piece of the femur 233 and a second butt-end piece of the femur 234. In an embodiment of the invention, the weights of the first butt-end piece of the femur 233 and the second butt-end piece of the femur 234 would differ, for example, by less than approximately 25%, or in another embodiment by less than approximately 20%, or in another embodiment by less than approximately 15%, or in another embodiment by less than approximately 10%, or in yet another embodiment by less than approximately 5%, and in still another embodiment by less than approximately 1%.

Figure 2F:
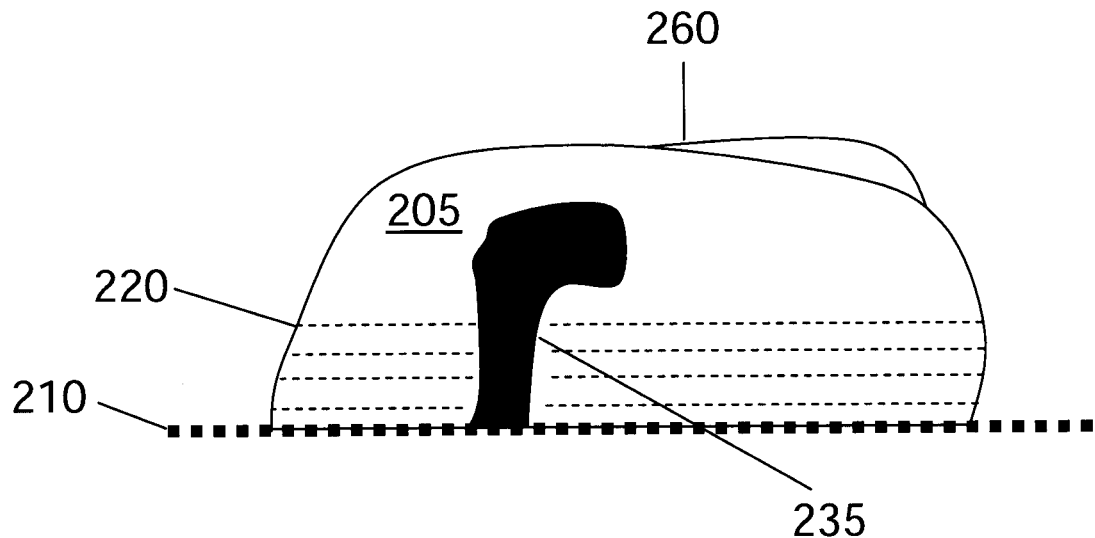
FIG. 2f shows a shank-end quarter of a SBO ham according to an exemplary embodiment of the present invention.
Figure 2G:
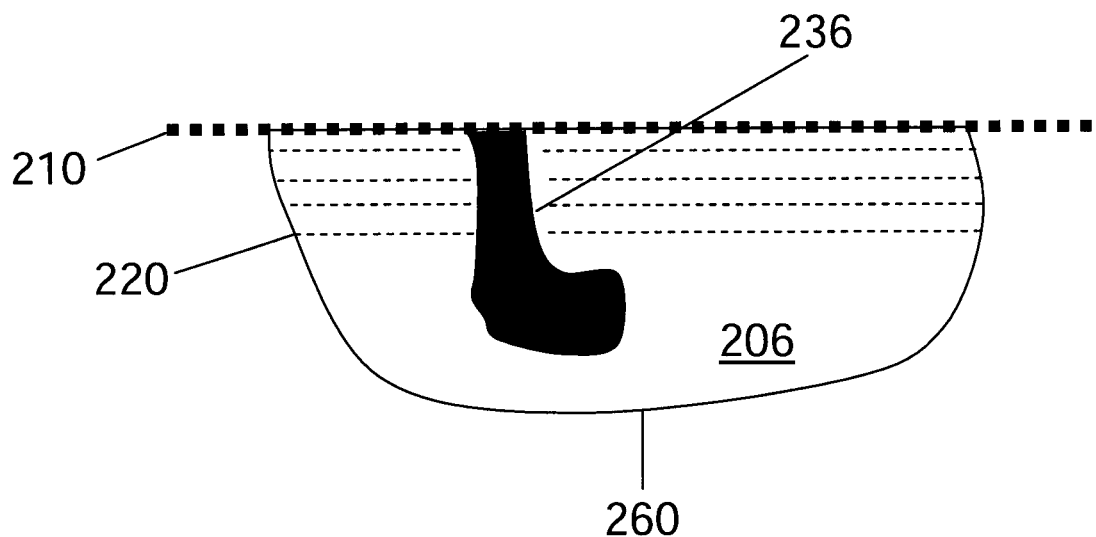
FIG. 2g shows a shank-end quarter of a SBO ham according to an exemplary embodiment of the present invention.

Referring now to FIGS. 2c, 2f and 2g, pieces of a SBO ham may be made according to an exemplary embodiment of the invention by separating the shank-end piece 202. The shank-end piece 202 may be separated along a first longitudinal plane 213 or a second longitudinal plane 214, resulting in a first piece 203 and a second piece 204. The plane along which the separation is made is substantially perpendicular to the cut face of the shank-end piece 202. According to an embodiment of the invention, the angle between the plane along which the separation is made and the long axis of the shank-end piece 215 is between approximately 40 degrees and approximately 50 degrees. According to another embodiment of the invention, the angle between the plane along which the separation is made and the long axis of the shank-end piece 215 is between approximately 43 degrees and approximately 47 degrees. According to yet another embodiment of the invention, the angle between the plane along which the separation is made and the long axis of the shank-end piece 215 is approximately 45 degrees.

According to another exemplary embodiment of the present invention, the shank-end piece 202 may instead be separated substantially along the long axis of the shank piece 215.

Whether the shank-end piece 202 is separated along the first longitudinal plane 213, the second longitudinal plane 214, or the long axis 215 of the shank piece, separation of the shank-end piece 202 divides the shank-end piece of the femur 232 into a first shank-end piece of the femur 235 and a second shank-end piece of the femur 236. In an embodiment of the invention, the weights of the first shank-end piece of the femur 235 and the second shank-end piece of the femur 236 would differ, for example, by less than approximately 25%, or in another embodiment by less than approximately 20%, or in another embodiment by less than approximately 15%, or in another embodiment by less than approximately 10%, or in yet another embodiment by less than approximately 5%, and in still another embodiment by less than approximately 1%.

Referring to FIGS. 2d, 2e, 2f, and 2g, a SBO ham is shown divided into four pieces according to an exemplary embodiment of the invention. In an embodiment of the invention, in the pieces made from a single ham the weights of the heaviest and the lightest pieces differ, for example, by less than approximately 25%, or in another embodiment by less than approximately 20%, or in another embodiment by less than approximately 15%, or in another embodiment by less than approximately 10%, or in yet another embodiment by less than approximately 5%, and in still another embodiment by less than approximately 1%. In another embodiment of the invention, in the pieces made from a single ham the total weight of bone in the piece having the most bone and the piece having the least bone differ, for example, by less than approximately 25%, or in another embodiment by less than approximately 20%, or in another embodiment by less than approximately 15%, or in another embodiment by less than approximately 10%, or in yet another embodiment by less than approximately 5%, and in still another embodiment by less than approximately 1%. In yet another embodiment of the invention, in the pieces made from a single ham the ratio of meat to bone in the piece having the highest ratio of meat-to-bone and the piece having the lowest ratio of meat-to-bone would differ, for example, by less than approximately 25%, or in another embodiment by less than approximately 20%, or in another embodiment by less than approximately 15%, or in another embodiment by less than approximately 10%, or in yet another embodiment by less than approximately 5%, and in still another embodiment by less than approximately 1%.

Figure 3A:
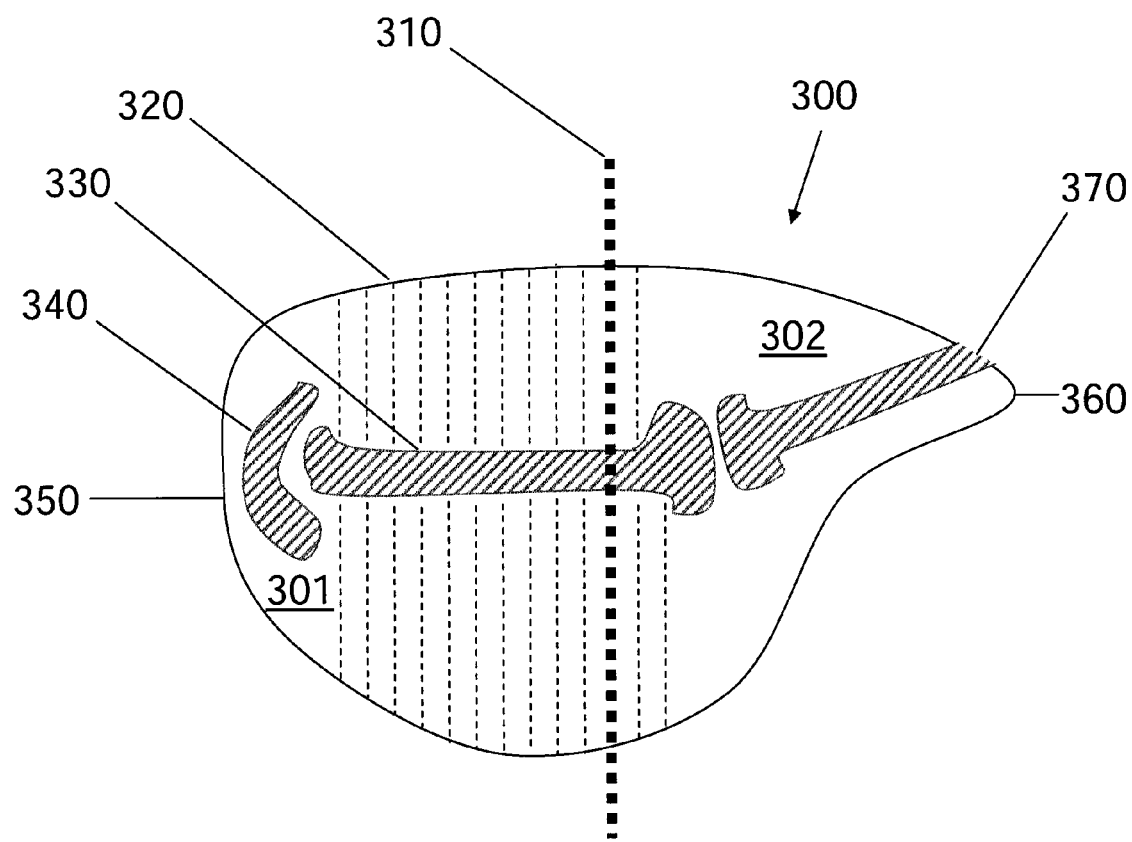
FIG. 3a shows a short-shank ham according to an exemplary embodiment of the present invention.

Referring to FIG. 3a, a short-shank ham is shown according to an exemplary embodiment of the present invention. A person of ordinary skill in the art recognizes that the short-shank ham 300 is not drawn to scale and may have any configuration of the bones contained therein, as known to one of ordinary skill in the art. Short-shank ham 300 typically comprises three bones: a shank bone 370, a femur bone 330, and an aitch bone 340. The aitch bone 340 is positioned substantially at the butt end 350 of the short-shank ham 300. The shank bone 370 extends substantially from a shank tip 360 of the short-shank ham 300 to the femur bone 330, which is positioned at a different angle from the shank bone 370. At the butt end 350 of the short-shank ham 300, the femur bone 330 is proximate to the aitch bone 340. In an exemplary embodiment of the present invention, the short-shank ham may be spirally-sliced 320 substantially the length of the short-shank ham 300 and substantially centered about the femur bone 330. A short-shank ham 300 may be separated along a transverse plane 310, resulting in a butt-end piece 301 and a shank-end piece 302.

Figure 3B:
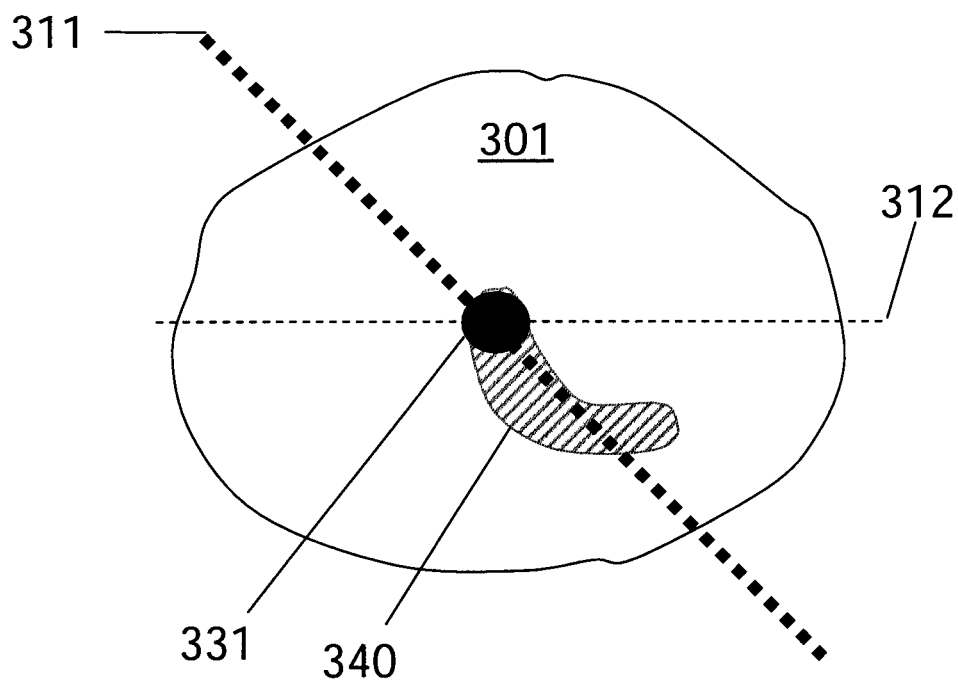
FIG. 3b shows a butt-end piece of a short-shank ham according to an exemplary embodiment of the present invention.
Figure 3C:
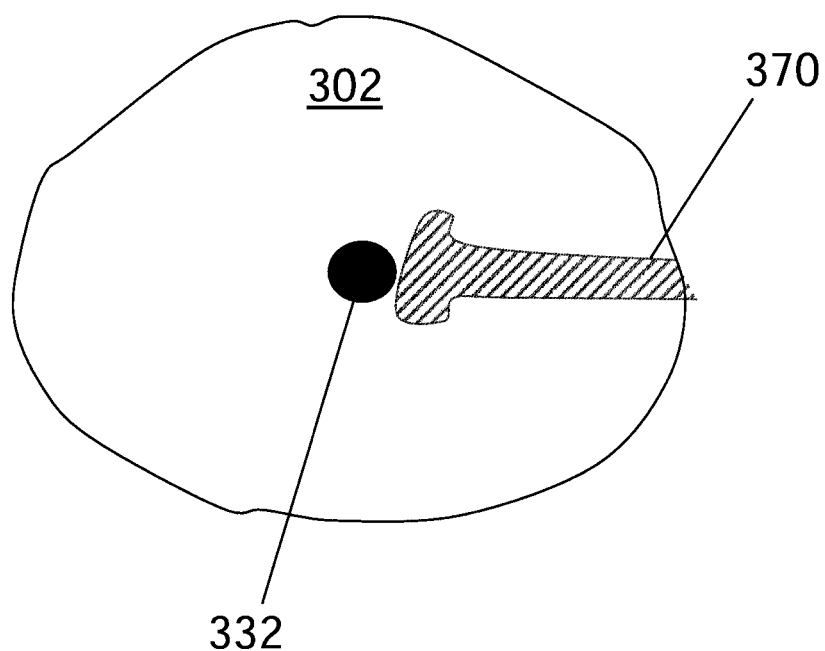
FIG. 3c shows a shank-end piece of a short-shank ham according to an exemplary embodiment of the present invention.

Referring also to FIGS. 3b and 3c, shown are views of the cut faces of the butt-end piece 301 and shank-end piece 302, respectively, according to an exemplary embodiment of the present invention. Referring also to FIG. 3f, shown is a side view of shank-end piece 302. The aitch bone 340 and shank bone 370 are shown crosshatched to indicate that they are inside the meat and thus would not be visible on the cut faces.

A separation along the transverse plane 310 separates the femur bone 330 into the butt-end piece of the femur 331 and the shank-end piece of the femur 332. In an exemplary embodiment of the present invention, the ham may be spirally sliced and the separation along transverse plane 310 may separate a short-shank ham 300 between spiral slices 320. In another exemplary embodiment of the invention, a ham that is not spirally sliced may be separated along the transverse plane 310. In an embodiment of the invention, the butt-end piece 301 comprises approximately 55% to 75% by weight of the short-shank ham 300. In another embodiment of the invention, the butt-end piece 301 comprises approximately 60% to 70% by weight of the short-shank ham 300. In yet another embodiment of the invention, the butt-end piece 301 comprises approximately 63% to 67% by weight of the short-shank ham 300. In still another embodiment of the invention, the butt-end piece 301 comprises approximately 65% by weight of the short-shank ham 300.

Figure 3D:
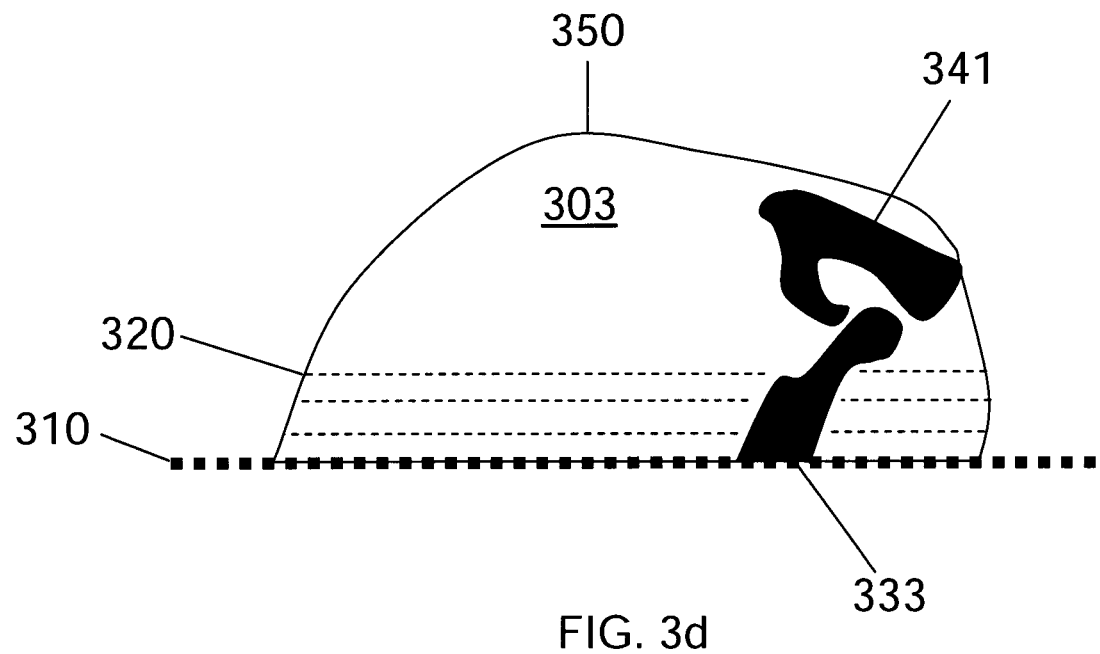
FIG. 3d shows a butt-end third of a short-shank ham according to an exemplary embodiment of the present invention.
Figure 3E:
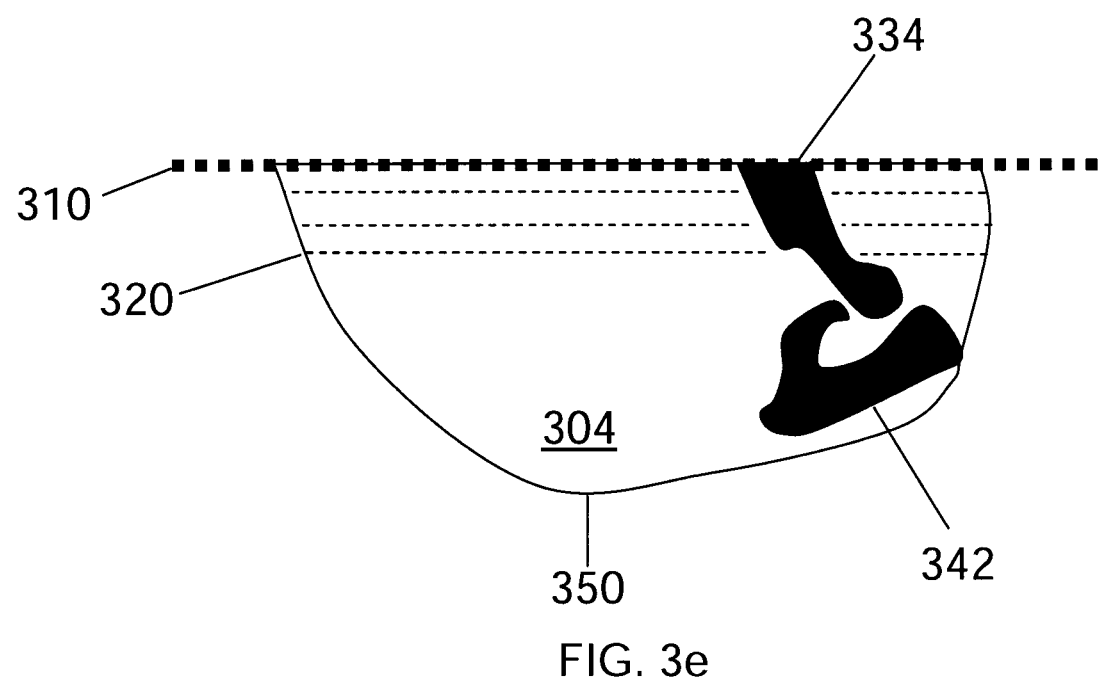
FIG. 3e shows a butt-end third of a short-shank ham according to an exemplary embodiment of the present invention.
Figure 3F:
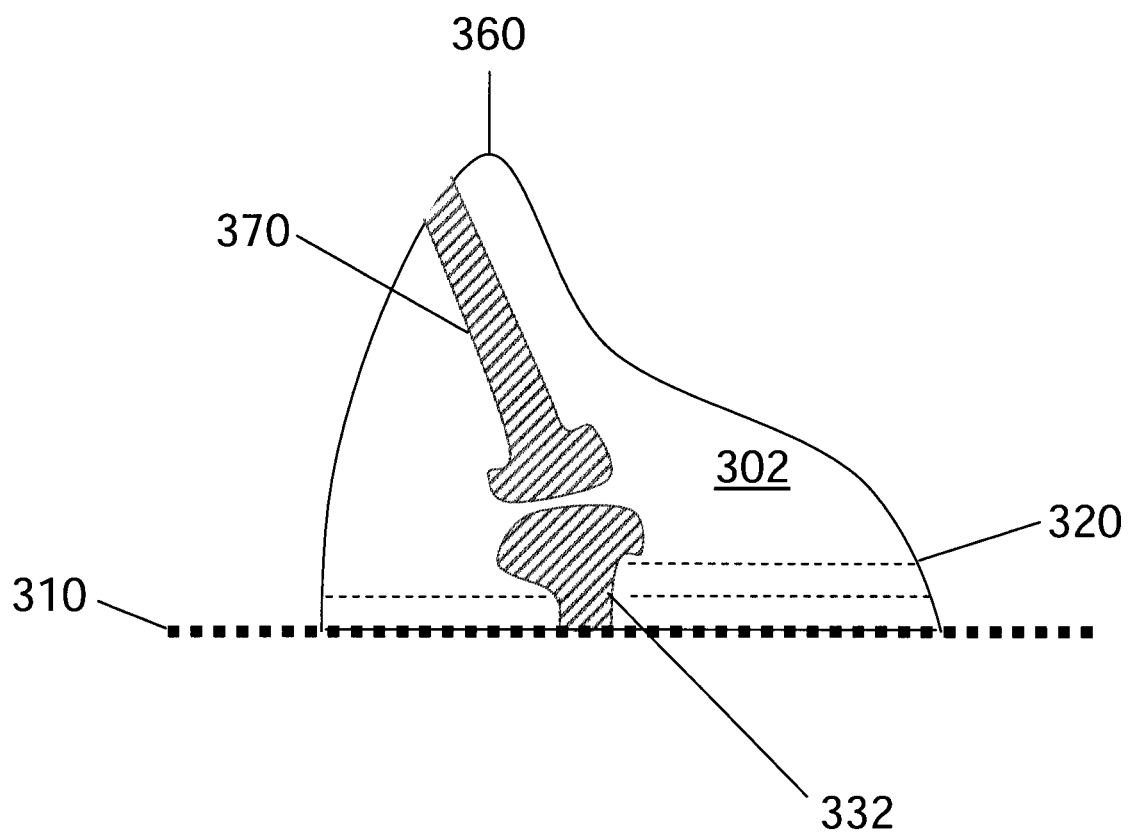
FIG. 3f shows a shank-end of a short-shank ham according to an exemplary embodiment of the present invention.

Referring now to FIGS. 3b, 3d and 3e, pieces of a short-shank ham may be made according to an exemplary embodiment of the invention by separating the butt-end piece 301. The butt-end piece 301 may be separated along the longitudinal plane 311, resulting in a first piece 303 and a second piece 304. The separation along longitudinal plane 311 is made such that the aitch bone is divided into pieces of substantially equal weight. The longitudinal plane 311 is substantially perpendicular to the cut face of the butt-end piece 301. According to an embodiment of the invention, the angle between the longitudinal plane 311 and the long axis of the butt-end piece 312 is between approximately 40 degrees and approximately 50 degrees. According to another embodiment of the invention, the angle between the longitudinal plane 311 and the long axis of the butt-end piece 312 is between approximately 43 degrees and approximately 47 degrees. According to yet another embodiment of the invention, the angle between the longitudinal plane 311 and the long axis of the butt-end piece 312 is approximately 45 degrees.

Separation of the butt-end piece 301 along the longitudinal plane 311 divides the aitch bone 340 into a first aitch bone piece 341 and a second aitch bone piece 342. In an embodiment of the invention, the weights of the first aitch bone piece 341 and the second aitch bone piece 342 would differ, for example, by less than approximately 25%, or in another embodiment by less than approximately 20%, or in another embodiment by less than approximately 15%, or in another embodiment by less than approximately 10%, or in yet another embodiment by less than approximately 5%, and in still another embodiment by less than approximately 1%.

Separation of the butt-end piece 301 along the longitudinal plane 311 also divides the butt-end piece of the femur 331 into a first butt-end piece of the femur 333 and a second butt-end piece of the femur 334. In an embodiment of the invention, the weights of the first butt-end piece of the femur 333 and the second butt-end piece of the femur 334 would differ, for example, by less than approximately 25%, or in another embodiment by less than approximately 20%, or in another embodiment by less than approximately 15%, or in another embodiment by less than approximately 10%, or in yet another embodiment by less than approximately 5%, and in still another embodiment by less than approximately 1%.

Referring to FIGS. 3d, 3e, and 3f, a short-shank ham is shown divided into three pieces according to an exemplary embodiment of the invention. In an embodiment of the invention, in the pieces made from a single ham the weights of the heaviest and the lightest pieces differ, for example, by less than approximately 25%, or in another embodiment by less than approximately 20%, or in another embodiment by less than approximately 15%, or in another embodiment by less than approximately 10%, or in yet another embodiment by less than approximately 5%, and in still another embodiment by less than approximately 1%. In another embodiment of the invention, in the pieces made from a single ham the total weight of bone in the piece having the most bone and the piece having the least bone differ, for example, by less than approximately 25%, or in another embodiment by less than approximately 20%, or in another embodiment by less than approximately 15%, or in another embodiment by less than approximately 10%, or in yet another embodiment by less than approximately 5%, and in still another embodiment by less than approximately 1%. In yet another embodiment of the invention, in the pieces made from a single ham the ratio of meat to bone in the piece having the highest ratio of meat-to-bone and the piece having the lowest ratio of meat-to-bone would differ, for example, by less than approximately 25%, or in another embodiment by less than approximately 20%, or in another embodiment by less than approximately 15%, or in another embodiment by less than approximately 10%, or in yet another embodiment by less than approximately 5%, and in still another embodiment by less than approximately 1%.

Figure 4A:
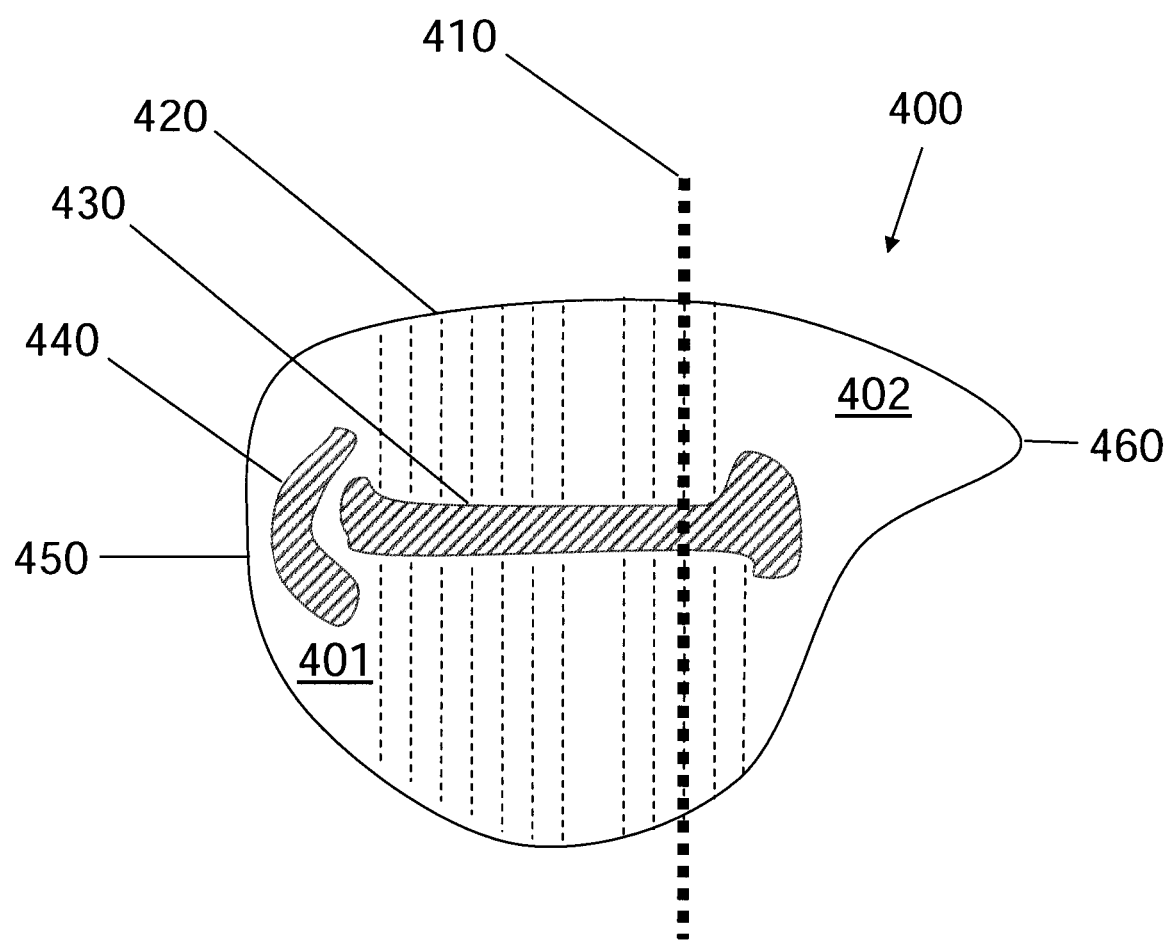
FIG. 4a shows a SBO ham according to an exemplary embodiment of the present invention.

Referring to FIG. 4a, a shank bone out (SBO) ham is shown according to an exemplary embodiment of the present invention. A person of ordinary skill in the art recognizes that the SBO ham 400 is not drawn to scale and may have any configuration of the bones contained therein, as known to one of ordinary skill in the art. SBO ham 400 typically comprises two bones: a femur bone 430, and an aitch bone 440. The aitch bone 440 is positioned substantially at the butt end 450 of the SBO ham 400. At the butt end 450 of the SBO ham 400, the femur bone 430 is proximate to the aitch bone 440. In an exemplary embodiment of the present invention, the SBO ham may be spirally-sliced 420 substantially the length of the SBO ham 400 and substantially centered about the femur bone 430. A SBO ham 400 may be separated along a transverse plane 410, resulting in a butt-end piece 401 and a shank-end piece 402.

Figure 4B:
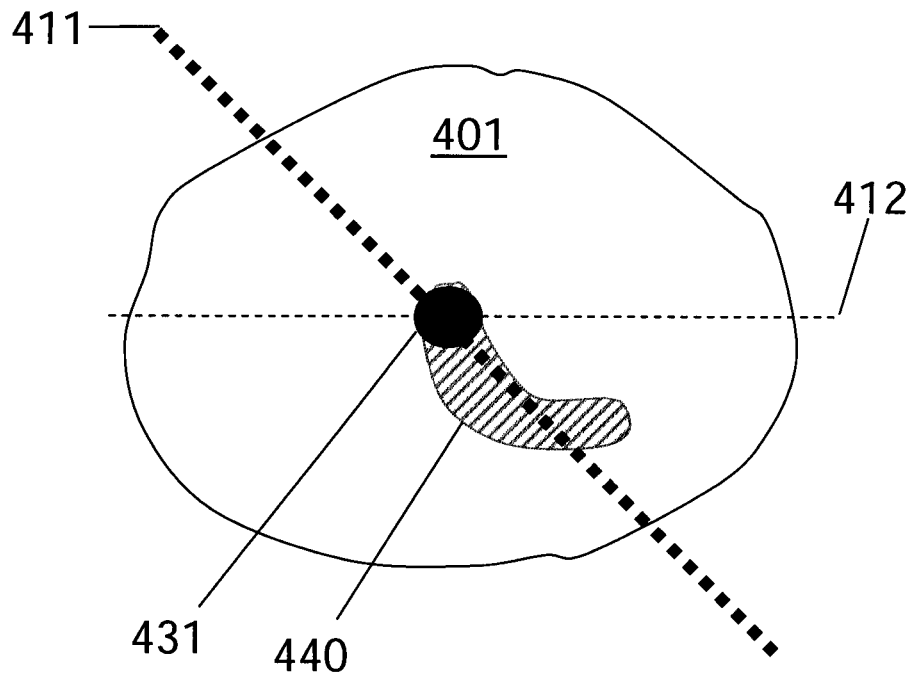
FIG. 4b shows a butt-end piece of a SBO ham according to an exemplary embodiment of the present invention.
Figure 4C:
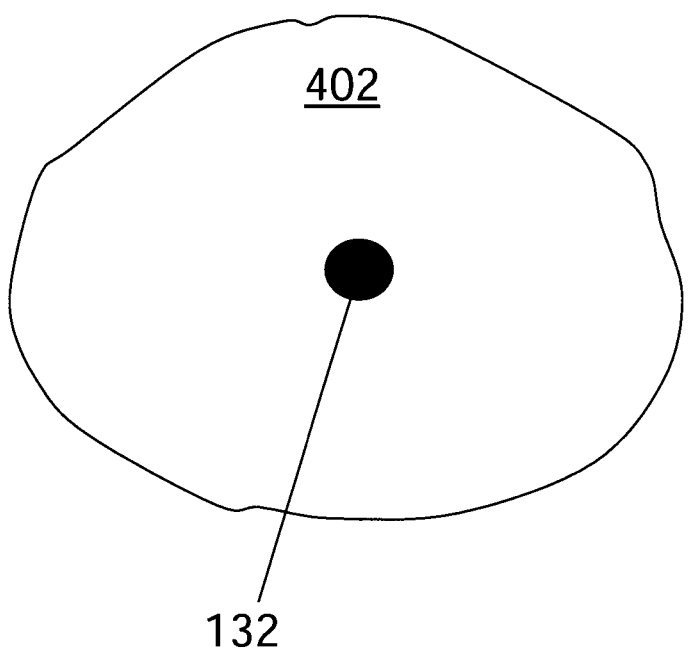
FIG. 4c shows a shank-end piece of a SBO ham according to an exemplary embodiment of the present invention.

Referring also to FIGS. 4b and 4c, shown are views of the cut faces of the butt-end piece 401 and shank-end piece 402, respectively, according to an exemplary embodiment of the present invention. Referring also to FIG. 4f, shown is a side view of shank-end piece 402. The aitch bone 440 is shown crosshatched to indicate that it is inside the meat and thus would not be visible on the cut face.

A separation along the transverse plane 410 separates the femur bone 430 into the butt-end piece of the femur 431 and the shank-end piece of the femur 432. In an exemplary embodiment of the present invention, the ham may be spirally sliced and the separation along transverse plane 410 may separate a SBO ham 400 between spiral slices 420. In another exemplary embodiment of the invention, a ham that is not spirally sliced may be separated along the transverse plane 410. In an embodiment of the invention, the butt-end piece 401 comprises approximately 35% to 55% by weight of the SBO ham 400. In another embodiment of the invention, the butt-end piece 401 comprises approximately 40% to 50% by weight of the SBO ham 400. In yet another embodiment of the invention, the butt-end piece 401 comprises approximately 43% to 47% by weight of the SBO ham 400. In still another embodiment of the invention, the butt-end piece 401 comprises approximately 45% by weight of the SBO ham 400.

Figure 4D:
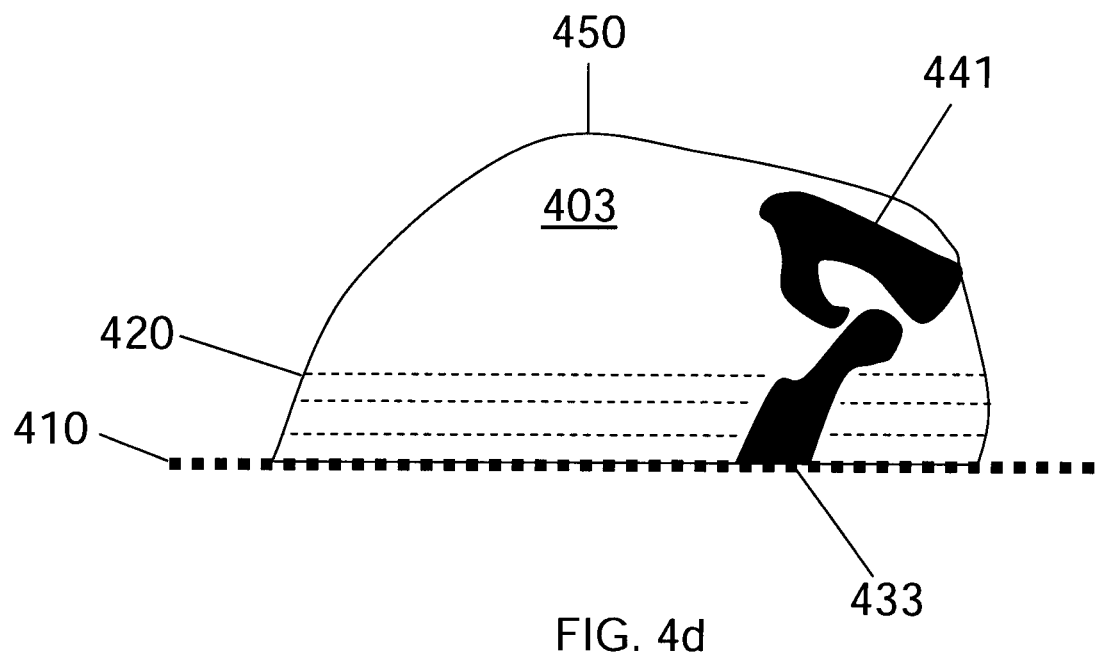
FIG. 4d shows a butt-end third of a SBO ham according to an exemplary embodiment of the present invention.
Figure 4E:
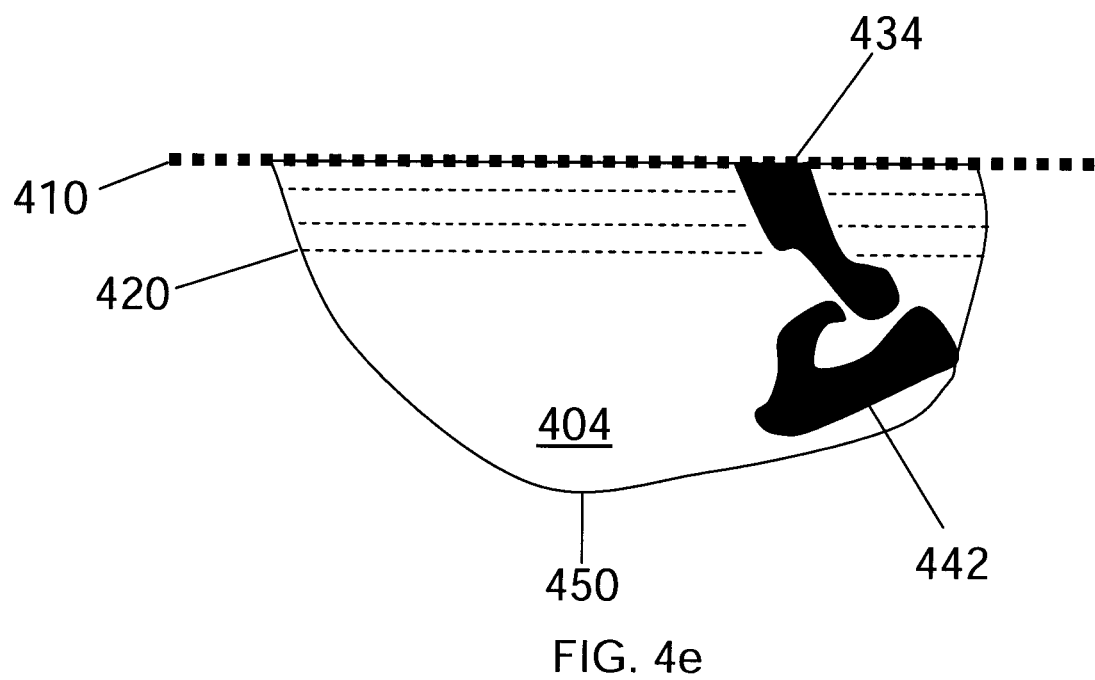
FIG. 4e shows a butt-end third of a SBO ham according to an exemplary embodiment of the present invention.
Figure 4F:
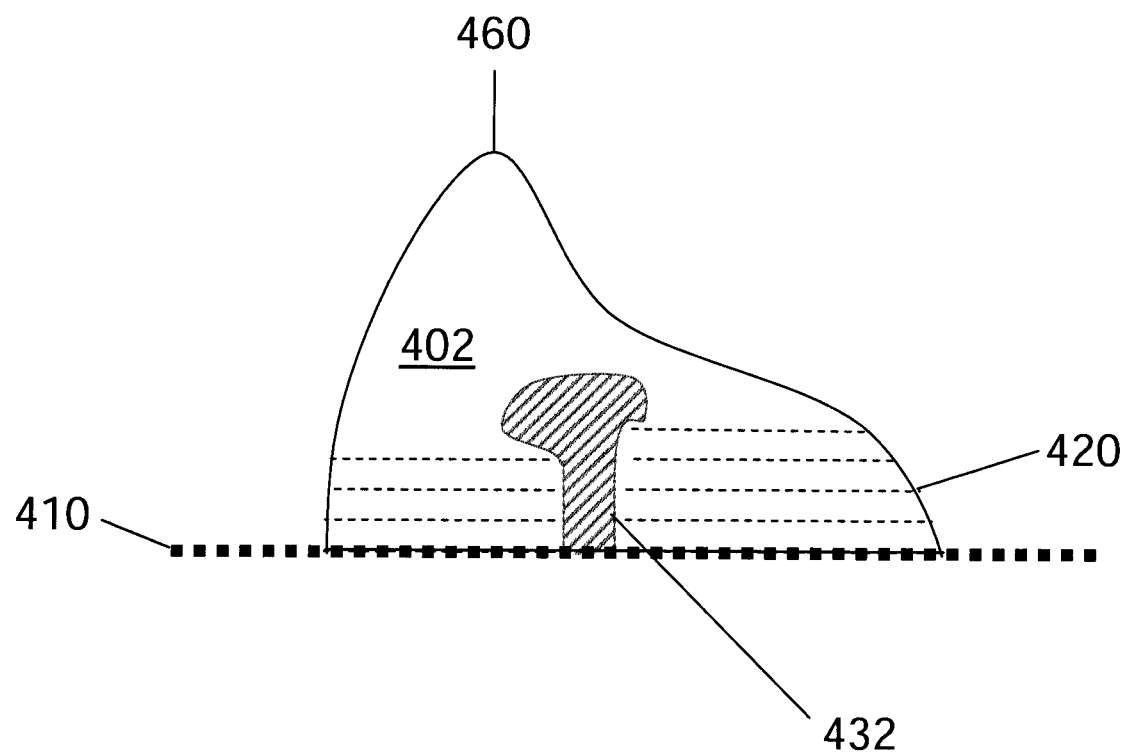
FIG. 4f shows a shank-end of a SBO ham according to an exemplary embodiment of the present invention.

Referring now to FIGS. 4b, 4d and 4e, pieces of a SBO ham may be made according to an exemplary embodiment of the invention by separating the butt-end piece 401. The butt-end piece 401 may be separated along the longitudinal plane 411, resulting in a first piece 403 and a second piece 404. The separation along longitudinal plane 411 is made such that the aitch bone is divided into pieces of substantially equal weight. The longitudinal plane 411 is substantially perpendicular to the cut face of the butt-end piece 401. According to an embodiment of the invention, the angle between the longitudinal plane 411 and the long axis of the butt-end piece 412 is between approximately 40 degrees and approximately 50 degrees. According to another embodiment of the invention, the angle between the longitudinal plane 411 and the long axis of the butt-end piece 412 is between approximately 43 degrees and approximately 47 degrees. According to yet another embodiment of the invention, the angle between the longitudinal plane 411 and the long axis of the butt-end piece 412 is approximately 45 degrees.

Separation of the butt-end piece 401 along the longitudinal plane 411 divides the aitch bone 440 into a first aitch bone piece 441 and a second aitch bone piece 442. In an embodiment of the invention, the weights of the first aitch bone piece 441 and the second aitch bone piece 442 would differ, for example, by less than approximately 25%, or in another embodiment by less than approximately 20%, or in another embodiment by less than approximately 15%, or in another embodiment by less than approximately 10%, or in yet another embodiment by less than approximately 5%, and in still another embodiment by less than approximately 1%.

Separation of the butt-end piece 401 along the longitudinal plane 411 also divides the butt-end piece of the femur 431 into a first butt-end piece of the femur 433 and a second butt-end piece of the femur 434. In an embodiment of the invention, the weights of the first butt-end piece of the femur 433 and the second butt-end piece of the femur 434 would differ, for example, by less than approximately 25%, or in another embodiment by less than approximately 20%, or in another embodiment by less than approximately 15%, or in another embodiment by less than approximately 10%, or in yet another embodiment by less than approximately 5%, and in still another embodiment by less than approximately 1%.

Referring to FIGS. 4d, 4e, and 4f, a SBO ham is shown divided into three pieces according to an exemplary embodiment of the invention. In an embodiment of the invention, in the pieces made from a single ham the weights of the heaviest and the lightest pieces differ, for example, by less than approximately 25%, or in another embodiment by less than approximately 20%, or in another embodiment by less than approximately 15%, or in another embodiment by less than approximately 10%, or in yet another embodiment by less than approximately 5%, and in still another embodiment by less than approximately 1%. In yet another embodiment of the invention, in the pieces made from a single ham the ratio of meat to bone in the piece having the highest ratio of meat-to-bone and the piece having the lowest ratio of meat-to-bone would differ, for example, by less than approximately 25%, or in another embodiment by less than approximately 20%, or in another embodiment by less than approximately 15%, or in another embodiment by less than approximately 10%, or in yet another embodiment by less than approximately 5%, and in still another embodiment by less than approximately 1%.

The invention is not limited to making separations in any particular order. For example, without intention to be limited thereto, the present invention contemplates spiral slicing before or after separating a ham into pieces, or making the separations that divide the femur longitudinally before or after making the separations that divide the femur transversely.

In an exemplary embodiment, the bone-in ham 100, 200, 300, 400 is spirally-sliced substantially about the femur bone 130, 230, 330, 430. Methods for spiral-slicing bone-in hams are known to one of ordinary skill in the art. For example, the bone-in ham 100, 200, 300, 400 can be spirally-sliced according to the methods disclosed in U.S. Pat. Nos. 2,470,078 and 2,599,328 to Hoenselaar, which are hereby incorporated by reference in their entirety. The spiral-sliced meat of the bone-in ham 100, 200, 300, 400 can extend up to the femur bone 130, 230, 330, 430, substantially near the femur bone 130, 230, 330, 430, or any distance from the femur bone 130, 230, 330, 430. The spiral slicing can extend from one end of the bone-in ham 100, 200, 300, 400 to the other end, or any variation of length and configuration therebetween.

Separating portions of the bone-in ham along the longitudinal or transverse planes can be accomplished by any means known to one of ordinary skill in the art. In an embodiment of the invention, separating is performed by cutting with a serrated instrument. In another embodiment of the invention, a bone-in ham can be cut with any suitable instrument such as a knife, saw, bandsaw, table saw, blade, or other cutting instruments, or combinations thereof. In another embodiment of the invention, each of the cuts may be made with a different instrument or a different type of instrument, or one or more of the cuts may be made using the same instrument or same type of instrument.

Although this description uses the term "quarter," it is not intended to be limited to an exact quarter portion of a bone-in ham. In fact, the term is used to reflect that an approximate half of a bone-in ham has been further separated in approximately half. If each approximate half were separated substantially in half, then four substantial quarters are produced. Similarly, although this description uses the term "third," it is not intended to be limited to an exact third portion of a bone-in ham. In fact, the term is used to reflect that a bone-in ham has been separated into an approximate two-thirds and an approximate one-third. If the approximate two-thirds was separated substantially in half, then three substantial thirds are produced.

The embodiments described above are intended to be exemplary. One skilled in the art recognizes that numerous alternative components and embodiments that may be substituted for the particular examples described herein and still fall within the scope of the invention.

The invention claimed is:

1. A bone-in ham product made by a method comprising the steps of:
    separating a bone-in ham into a butt-end piece and a shank-end piece; and
    separating the butt-end piece into a first portion and a second portion;
        wherein the weight of aitch bone in the first portion and the second portion differ by less than approximately 25%;
        wherein the weight of femur bone in the first portion and the second portion differ by less than approximately 25%;
        wherein the butt-end piece is separated into the first portion and the second portion along a plane that divides the femur substantially longitudinally;
        wherein the first and second portion have a nearly equal meat-to-bone ratio;
        wherein the third and fourth portion have a nearly equal meat-to-bone ratio; and
        wherein the weights of the heaviest and the lightest pieces differ by less than approximately 5%.

2. The product of claim 1, wherein the angle between said plane and the long axis of the bone-in ham is between approximately 40 degrees and approximately 50 degrees.

3. The product of claim 2, wherein said angle is between approximately 43 and approximately 47 degrees.

4. The product of claim 3, wherein said angle is approximately 45 degrees.

5. The product of claim 1, wherein the butt-end piece comprises between 55% and 75% by weight of the bone-in ham.

6. The product of claim 1, wherein the butt-end piece comprises between approximately 35% and 55% by weight of the bone-in ham.

7. The product of claim 6, made by the method further comprising separating the shank-end piece into a third portion and a fourth portion.

8. The product of claim 1, wherein the bone-in ham is spiral-sliced.

9. The product of claim 1, wherein the bone-in ham is not spiral-sliced.

10. The product of claim 1, wherein the shank-end piece has been de-boned to remove the shank bone from the shank-end piece.

11. The product of claim 1, wherein one or more steps of providing a separation comprises cutting the bone-in ham using a knife, a saw, a bandsaw, a table saw, a blade, or combinations thereof.

* * * * *

UNITED STATES PATENT AND TRADEMARK OFFICE
CERTIFICATE OF CORRECTION

| | | |
|---|---|---|
| PATENT NO. | : 8,545,918 B2 | Page 1 of 1 |
| APPLICATION NO. | : 12/122940 | |
| DATED | : October 1, 2013 | |
| INVENTOR(S) | : Frankman et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1181 days.

Signed and Sealed this
Seventeenth Day of February, 2015

Michelle K. Lee
*Deputy Director of the United States Patent and Trademark Office*